US009015729B2

(12) United States Patent
Song et al.

(10) Patent No.: US 9,015,729 B2
(45) Date of Patent: Apr. 21, 2015

(54) MOBILE APPARATUS EXECUTING EFFICIENT DATAFLOW EXECUTION FOR MOBILE CONTEXT MONITORING, METHOD OF EXECUTING DATAFLOW USING THE SAME, METHOD OF CONTEXT MONITORING USING THE SAME AND CONTEXT MONITORING SYSTEM INCLUDING THE SAME

(71) Applicant: Korea Advanced Institute of Science and Technology, Daejeon (KR)

(72) Inventors: Junehwa Song, Daejeon (KR); Younghyun Ju, Daejeon (KR); Chulhong Min, Daejeon (KR); Youngki Lee, Daejeon (KR); Jihyun Yu, Daejeon (KR)

(73) Assignee: Korea Advanced Institute of Science and Technology, Yuseong-Gu, Daejeon (KR)

( * ) Notice: Subject to any disclaimer, the term of this patent is extended or adjusted under 35 U.S.C. 154(b) by 20 days.

(21) Appl. No.: 13/847,687

(22) Filed: Mar. 20, 2013

(65) Prior Publication Data

US 2014/0245323 A1   Aug. 28, 2014

(51) Int. Cl.
*G06F 3/00* (2006.01)
*G06F 9/54* (2006.01)

(52) U.S. Cl.
CPC .................................. *G06F 9/54* (2013.01)

(58) Field of Classification Search
CPC ... H04L 63/20; G06F 17/30; G06F 17/30528; G06F 11/30; H04W 4/02; H04W 40/00; H04W 4/14; H04M 1/7253; H04M 2250/02
See application file for complete search history.

(56) References Cited

U.S. PATENT DOCUMENTS

| | | | |
|---|---|---|---|
| 6,496,817 B1* | 12/2002 | Whang et al. | 1/1 |
| 2006/0015699 A1* | 1/2006 | Fujiwara et al. | 711/162 |
| 2010/0017526 A1* | 1/2010 | Jagannath et al. | 709/229 |
| 2010/0064357 A1* | 3/2010 | Baird et al. | 726/6 |
| 2010/0254405 A1* | 10/2010 | Haydock | 370/464 |
| 2011/0069632 A1* | 3/2011 | Chen et al. | 370/253 |
| 2011/0310751 A1* | 12/2011 | Song et al. | 370/252 |
| 2012/0203754 A1* | 8/2012 | Biran et al. | 707/706 |
| 2013/0246672 A1* | 9/2013 | Saputra | 710/56 |
| 2014/0129611 A1* | 5/2014 | Norris et al. | 709/202 |

OTHER PUBLICATIONS

Ju et al. "An Efficient Dataflow Execution Method for Mobile Context Monitoring Applications," *Computer Science, KAIST*, Daejeon, Korea, This Paper appeared in Pervasive Computing and Communications (PerCom) 2012 IEEE International Conference, Mar. 19-23, 2012, pp. 116-121.

* cited by examiner

*Primary Examiner* — Tuan Dao
(74) *Attorney, Agent, or Firm* — Womble Carlyle Sandridge & Rice, LLP

(57) ABSTRACT

A mobile apparatus includes a processing planner and a plan processor. The processing planner generates a plurality of resource use plans in response to a context monitoring query (CMQ) of an application, and selects a final plan satisfying a request of the CMQ among the resource use plans. The plan processor executes the final plan. Accordingly, the mobile apparatus may support resource-efficient context monitoring.

9 Claims, 5 Drawing Sheets

FIG. 5

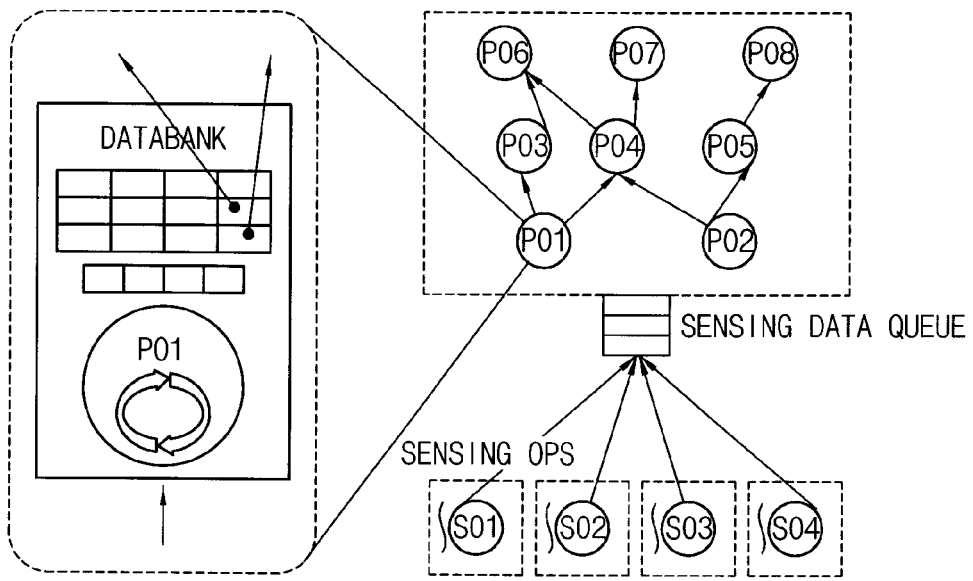

FIG. 6

| Function: execute() |
| Input : $input\_dw$, a DataWindow passed from previous operator |

1. $idx_p \leftarrow idx_c$  // $idx_p$ is set to the previous buffer index
2. $buf\_size \leftarrow$ the size of the shared output buffer
3. $operator.process\ (input\_dw)$
4. foreach entry of the flow table $te_i$
5.    $trig\_idx \leftarrow te_i.trig\_idx$
6.    // check the data requirement of the corresponding consumer
7.    if $\{(idx_p < idx_c)\ \&\&\ (idx_p < trig\_idx)\ \&\&\ (trig\_idx \le idx_c)\}\ ||$
         $\{(idx_p \ge idx_c)\ \&\&\ \{(idx_p < trig\_idx)\ ||\ (trig\_idx \le idx_c)\}\}$
8.       // if the requirement is met, a DataWindow is created
9.       DataWindow $out\_dw$
10.      $out\_dw.buffer\_ptr \leftarrow$ the pointer to its output buffer
11.      $out\_dw.start\_idx \leftarrow (te_i.trig\_idx - te_i.wsize)\ \%\ buf\_size$
12.      $out\_dw.length \leftarrow te_i.wsize$ 13.      // deliver the DataWindow via the consumer pointer
14.      $te_i.cons\_ptr.execute\ (out\_dw)$ 15.      // update $trig\_idx$ of the entry
16.      $te_i.trig\_idx = (te_i.trig\_idx + te_i.sl\_wsize)\ \%\ buf\_size$

MOBILE APPARATUS EXECUTING EFFICIENT DATAFLOW EXECUTION FOR MOBILE CONTEXT MONITORING, METHOD OF EXECUTING DATAFLOW USING THE SAME, METHOD OF CONTEXT MONITORING USING THE SAME AND CONTEXT MONITORING SYSTEM INCLUDING THE SAME

PRIORITY STATEMENT

This application claims priority under 35 U.S.C. §119 to Korean Patent Application No. 10-2013-0020477, filed on Feb. 26, 2013 in the Korean Intellectual Property Office (KIPO), the contents of which are herein incorporated by reference in their entireties.

BACKGROUND

1. Technical Field

Example embodiments relate to a mobile apparatus, a method of executing a dataflow using the mobile apparatus, a method of context monitoring using the mobile apparatus and a context monitoring system having the mobile apparatus. More particularly, example embodiments relate to a mobile apparatus capable of executing a dataflow efficiently, a method of executing a dataflow using the mobile apparatus, a method of context monitoring using the mobile apparatus and a context monitoring system having the mobile apparatus.

2. Description of the Related Art

Recent paradigm of information communication technology may be a ubiquitous computing, a ubiquitous network, a pervasive computing and so on. "Ubiquitous" means that a user may easily get any desired information anytime and anywhere. In an upcoming ubiquitous age, smart objects, having computing and communication function, may recognize a dynamic environment and be adaptive to the dynamic environment. In other words, the smart objects may have a context awareness feature.

A personal area network (PAN) is one of the core technologies realizing the ubiquitous network having the context awareness feature. The PAN is a network which is provided to a person to communicate in a close range. The person using the PAN may be connected with various devices in about 10 m with respect to the person.

The PAN is suitable for a context monitoring application, which provides proper services in response to an action of the user, a status of the user and an environment around the user. In the PAN environment, the network is operated around the person so that a portable mobile apparatus, capable of receiving data from various sensors and outputting context information to the context monitoring applications, may be a core platform. For example, a mobile terminal may recognize a context of the user by collecting and transmitting the sensed data, and may provide information to the context monitoring application by analyzing the sensed data. The context monitoring application may provide proper services to the user according to the context of the user. Accordingly, the mobile apparatus capable of supporting a number of the context monitoring applications may be necessary.

The context monitoring applications are increasingly emerging and becoming a major workload of the mobile apparatus such as a smart phone. The context monitoring applications continuously monitor contexts of users to provide situation-aware services. Their core is to transform high-rate raw sensed data to context information through a complex series of processing steps. Such a series of processing is commonly represented as a dataflow graph of operators.

The execution of complex context monitoring dataflow may impose significant overhead on the mobile apparatus such as a smart phone, especially considering the resource scarcity of the mobile apparatus supporting context monitoring. Naïve implementation may not be effective in supporting continuous monitoring upon high-rate input sensed data. It easily causes frequent invocation of computation-intensive operators. It may also incur significant overhead in executing and managing the dataflow graphs. With the high CPU overhead, only a small number of context monitoring applications can concurrently run on the mobile apparatus.

SUMMARY

Example embodiments provide a mobile apparatus executing a dataflow efficiently.

Example embodiments also provide a method of executing a dataflow using the mobile apparatus.

Example embodiments also provide a method of monitoring a context using the mobile apparatus.

Example embodiments also provide a context monitoring system having the mobile apparatus.

In an example mobile apparatus according to the present inventive concept, the mobile apparatus includes a plurality of operators. The operators are generated based on a dataflow graph of a context monitoring application. A producer operator among the operators includes a data bank including a shared output buffer storing data to transmit to consumer operators connected to the producer operator and a flow table storing information of the consumer operators.

In an example embodiment, the dataflow graph may include a plurality of primitive operators and an edge between the primitive operators.

In an example embodiment, the primitive operator may be defined as an identifier, a type and a parameter.

In an example embodiment, the edge may be defined as an identifier of a producer primitive operator disposed at a first end of the edge, an identifier of a consumer primitive operator disposed at a second end of the edge, a window size of data requested by the consumer primitive operator and a sliding window size of the data requested by the consumer primitive operator.

In an example embodiment, the shared output buffer may be a circular buffer.

In an example embodiment, a size of the shared output buffer may be set to the maximum value among window sizes of data requested by the consumer operators.

In an example embodiment, the shared output buffer may manage a current buffer index to point a buffer position to be written next.

In an example embodiment, the flow table may include an identifier of the consumer operator, a window size of data requested by the consumer operator, a sliding window size of the data requested by the consumer operator, a trigger index pointing an end position of next data for the consumer operator and a pointer of the data bank of the consumer operator.

In an example embodiment, the data bank of the producer operator may execute the producer operator when input data is inputted to the producer operator.

In an example embodiment, the data bank of the producer operator may check if output data are ready to be transmitted to the consumer operators after the execution of the producer operator.

In an example embodiment, the data bank of the producer operator may transmit the output data to the consumer operators when a current buffer index of the shared output buffer is greater than a previous buffer index, the trigger index is greater than the previous buffer index and the current buffer index is greater than the trigger index.

In an example embodiment, the output data may be defined as a buffer pointer, a start index and a length. The buffer pointer may be a pointer of the shared output buffer. The start index may be a difference between the trigger index and the window size. The length may be the window size.

In an example embodiment, the data bank of the producer operator may directly invoke an execute function of the consumer operator via the pointer of the data bank of the consumer operator.

In an example embodiment, the data bank of the producer operator may add the sliding window size to the trigger index to generate an updated trigger index after the producer operator transmits the output data to the consumer operators.

In an example embodiment, the plurality of the operators may include sensing operators and processing operators. The processing operators may be synchronously executed. The sensing operators may be asynchronously executed.

In an example embodiment, the mobile apparatus may further include a sensing data queue collecting sensed data of the sensing operators.

In an example method of executing a dataflow according to the present inventive concept, the method includes generating a plurality of operators based on a dataflow graph of a context monitoring application, storing data to transmit to consumer operators at a shared output buffer of a producer operator and transmitting output data to the consumer operators based on a flow table of the producer operator. The flow table stores information of the consumer operators.

In an example embodiment, the shared output buffer may manage a current buffer index to point a buffer position to be written next.

In an example embodiment, the flow table may include an identifier of the consumer operator, a window size of data requested by the consumer operator, a sliding window size of the data requested by the consumer operator, a trigger index pointing an end position of next data for the consumer operator and a pointer of a data bank of the consumer operator.

In an example embodiment, the method may further include executing the producer operator when input data is inputted to the producer operator.

In an example embodiment, the method may further include checking if the output data are ready to be transmitted to the consumer operators after executing the producer operator.

In an example embodiment, the output data may be transmitted to the consumer operators when a current buffer index of the shared output buffer is greater than a previous buffer index, the trigger index is greater than the previous buffer index and the current buffer index is greater than the trigger index.

In an example embodiment, the output data may be defined as a buffer pointer, a start index and a length. The buffer pointer may be a pointer of the shared output buffer. The start index may be a difference between the trigger index and the window size. The length may be the window size.

In an example embodiment, the producer operator may directly invoke an execute function of the consumer operator via the pointer of the data bank of the consumer operator.

In an example embodiment, the method may further include adding the sliding window size to the trigger index to generate an updated trigger index after the producer operator transmits the output data to the consumer operators.

In an example method of monitoring a context according to the present inventive concept, the method includes generating a plurality of operators based on a dataflow graph of a context monitoring application, storing data to transmit to consumer operators at a shared output buffer of a producer operator, transmitting output data to the consumer operators based on a flow table of the producer operator and transmitting a context monitoring result to the context monitoring application based on the output data. The flow table stores information of the consumer operators.

In an example context monitoring system according to the present inventive concept, the context monitoring system includes a sensor, a mobile apparatus and a context monitoring application. The sensor generates sensed data. The mobile apparatus receives the sensed data from the sensor. The mobile apparatus includes a plurality of operators. The operators are generated based on a dataflow graph of a context monitoring application. The context monitoring application receives a context monitoring result from the mobile apparatus. A producer operator among the operators includes a data bank including a shared output buffer storing data to transmit to consumer operators connected to the producer operator and a flow table storing information of the consumer operators.

According to the mobile apparatus, the method of executing the dataflow, the method of monitoring the context, and the context monitoring system, the number of data pass and scheduling operations may be reduced, redundant operations may be eliminated through the integrated management of data by the producer and repetitive memory allocation and deallocation upon new data generation may be avoided.

Thus, CPU usage for the context monitoring application may be decreased, and accordingly the number of the context monitoring applications which run concurrently may be increased.

BRIEF DESCRIPTION OF THE DRAWINGS

The above and other features and advantages of the present inventive concept will become more apparent by describing in detailed example embodiments thereof with reference to the accompanying drawings, in which:

FIG. 5 is a conceptual diagram illustrating a network of the data bank of the operator of the mobile apparatus of FIG. 1; and FIG. 6 is a pseudo code for data bank execution of the operator of the mobile apparatus of FIG. 1.

DETAILED DESCRIPTION OF THE EMBODIMENTS

Figure 1:
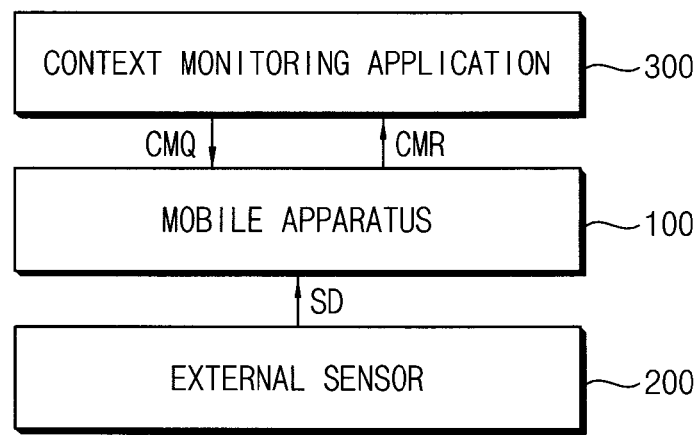
FIG. 1 is a block diagram illustrating a context monitoring system according to an example embodiment of the present inventive concept.

The present inventive concept now will be described more fully hereinafter with reference to the accompanying drawings, in which exemplary embodiments of the present invention are shown. The present inventive concept may, however, be embodied in many different forms and should not be construed as limited to the exemplary embodiments set fourth herein.

Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

FIG. 1 is a block diagram illustrating a context monitoring system according to an example embodiment of the present inventive concept.

Referring to FIG. 1, the context monitoring system includes a mobile apparatus 100, an external sensor 200 and a context monitoring application 300.

The mobile apparatus 100 receives a context monitoring query (CMQ) from the context monitoring application 300. The mobile apparatus 100 receives sensed data SD from the external sensor 200. The mobile apparatus 100 monitors whether the sensed data SD satisfies the context monitoring query CMQ. The mobile apparatus 100 determines whether the sensed data SD satisfies the context monitoring query CMQ and outputs a context monitoring result CMQ to the context monitoring application 300. A structure of the mobile apparatus 100 is explained in detail referring to FIG. 2.

The mobile apparatus 100 generates a plurality of operators based on a dataflow graph of the context monitoring application 300. The operator of the mobile apparatus 100 is explained in detail referring to FIGS. 3A to 5.

The external sensor 200 provides the sensed data SD to the mobile apparatus 100. Alternatively, the external sensor 200 may provide feature data extracted from the sensed data SD to the mobile apparatus 100.

For example, the external sensor 200 may include plurality of sensors. The external sensor 200 may be a light sensor, a temperature sensor, a position sensor, a dust sensor, an ultraviolet ray sensor, a hygrometer, a carbon dioxide detector, an ambient sound detector, an accelerometer and so on. Accordingly, the external sensor 200 may detect light, temperature, position, dust quantity, ultraviolet ray quantity, humidity, carbon dioxide quantity, ambient sound, acceleration and so on. The external sensor 200 may be a wearable sensor attached to a human body who is a user of the mobile apparatus 100.

The sensed data SD from the external sensor 200 are provided to the mobile apparatus 100, and are used to determine whether the sensed data SD satisfies a context requested by the context monitoring application 300.

The context monitoring application 300 requests the CMQ according to an object of program to the mobile apparatus 100. The mobile apparatus 100 registers the CMQ, and monitors whether the result of the CMQ changes to TRUE or FALSE. When the result of the CMQ changes, the mobile apparatus 100 provides a context monitoring result CMR to the context monitoring application 300.

Figure 2:
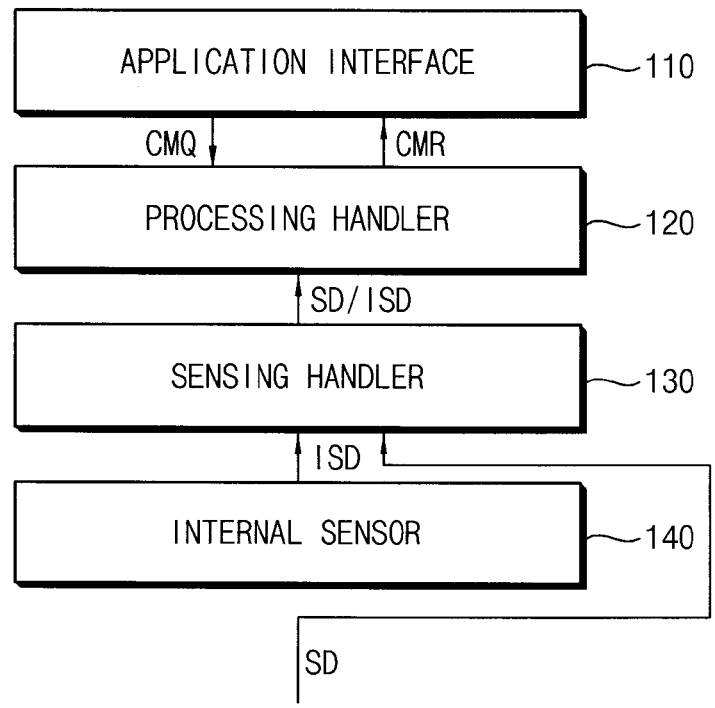
FIG. 2 is a block diagram illustrating a mobile apparatus of FIG. 1.

FIG. 2 is a block diagram illustrating the mobile apparatus 100 of FIG. 1.

Referring to FIGS. 1 and 2, the mobile apparatus 100 includes an application interface 110, a processing handler 120 and a sensing handler 130. The mobile apparatus 100 may further include an internal sensor 140.

The application interface 110 communicates with the context monitoring application 300. The application interface 110 receives the CMQ from the context monitoring application 300, and transmits the CMQ to the processing handler 120. The application interface 110 outputs the context monitoring result CMR to the context monitoring application 300.

The processing handler 120 receives the CMQ from the application interface 110. The processing handler 120 receives the sensed data SD and internal sensed data ISD from the sensing handler 130.

The processing handler 120 includes a plurality of processing operators. The processing handler 120 determines the context monitoring result CMR using the processing operator and outputs the context monitoring result CMR to the application interface 110. Each processing operator includes a data bank.

The sensing handler 130 receives the sensed data SD from the external sensor 200. The sensing handler 130 receives the internal sensed data ISD from the internal sensor 140.

The sensing handler 130 includes a plurality of sensing operators. The sensing handler 130 transmits the sensed data SD to the processing operators using the sensing operators. The sensing handler 130 may control the external sensor 200 and the internal sensor 140.

The internal sensor 140 provides the internal sensed data ISD to the sensing handler 130. Alternatively, the internal sensor 140 may provide the feature data extracted from the internal sensed data ISD to the sensing handler 130.

The internal sensed data ISD from the internal sensor 140 are provided to the sensing handler 130, and are used to determine whether the internal sensed data ISD satisfies a context requested by the context monitoring application 300.

Figure 3A:
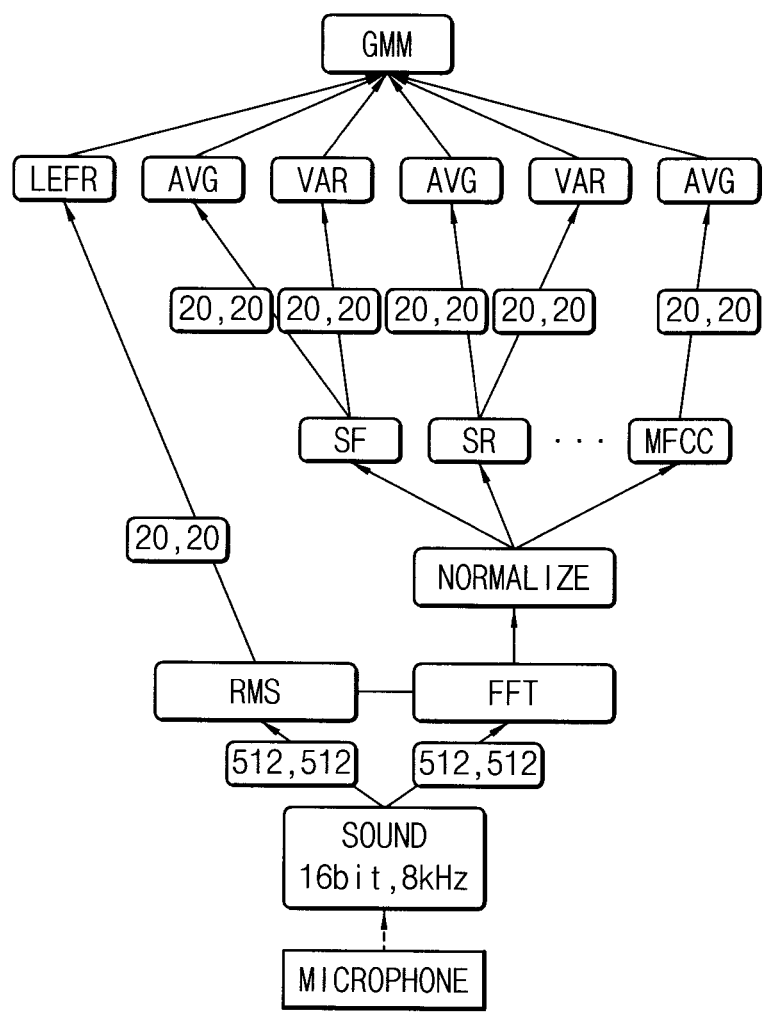
FIG. 3A is a conceptual diagram illustrating a dataflow graph of a first context monitoring application executed by the mobile apparatus of FIG. 1.
Figure 3B:
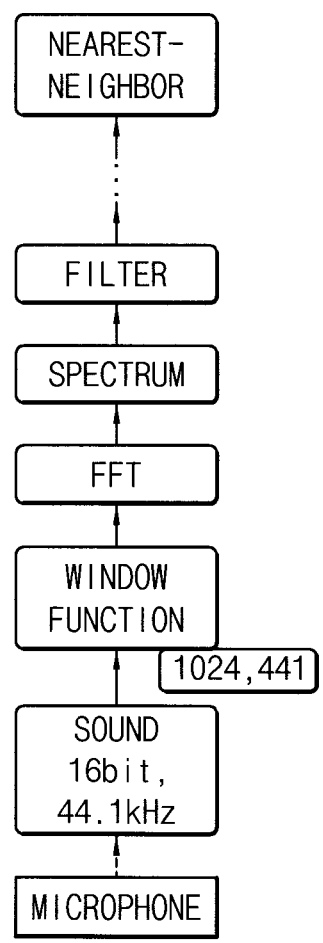
FIG. 3B is a conceptual diagram illustrating a dataflow graph of a second context monitoring application executed by the mobile apparatus of FIG. 1.

FIG. 3A is a conceptual diagram illustrating a dataflow graph of a first context monitoring application executed by the mobile apparatus 100 of FIG. 1. FIG. 3B is a conceptual diagram illustrating a dataflow graph of a second context monitoring application executed by the mobile apparatus 100 of FIG. 1.

Referring to FIGS. 3A and 3B, logic of the context monitoring application 300 is represented as a dataflow graph. The dataflow graph includes a primitive operator and an edge. The primitive operator represents a unit of computation and a unit of input and output. The edge represents data dependencies between two operators.

The primitive operator is defined as a 3-tuple (ID, type, parameter). The ID of the primitive operator means an identifier of the primitive operator. For example, the ID of the primitive operator may be a number such as one, two, three or four. The type of the primitive operator represents a specific operation of the primitive operator. For example, the type of the primitive operator may be RMS (root mean square), FFT (fast Fourier transform), Normalize and so on. The parameter of the primitive operator represents conditions for the operation. For example, one of the primitive operators, Sound, has the parameters of 16 bit and 8 kHz.

The primitive operator may include a sensing primitive operator generating sensed data and a processing primitive operator receiving input data and generating output data based on the input data.

The edge is defined as 4-tuple such as ID of the producer primitive operator, ID of the consumer primitive operator, a window size of the data requested by the consumer primitive operator and a sliding window size of the data requested by the consumer primitive operator.

The window size of the data means data quantity which the producer primitive operator sends to the consumer producer primitive operator at one time. The sliding window size of the data means an address of the data shifted at the next transmission from the producer primitive operator to the consumer primitive operator.

For example, when the window size of the data is 20 and the sliding window size of the data is 20, the producer primitive operator transmits data from address 1 to address 20 at a first transmission and data from address 21 to address 40 at a second transmission. When the window size of the data is 20 and the sliding window size of the data is 10, the producer primitive operator transmits data from address 1 to address 20 at a first transmission and data from address 11 to address 30 at a second transmission.

In FIG. 3A, the edge is represented using two numbers between the producer primitive operator and the consumer primitive operator. For example, the ID of the producer primitive operator is ID of the operator SOUND, the ID of the consumer primitive operator is ID of the operator RMS, the window size of the data is 512 and the sliding window size of the data is 512.

The dataflow graph in FIG. 3A is a dataflow graph of a context monitoring application, MusicMap. MusicMap collects and shares the information of played music in diverse city-wide places. For example, collecting music may be done by the internal sensor of the mobile apparatus. The mobile apparatus continuously collects ambient sound data, processes the ambient sound data, and reports the musical genre once music is detected.

In FIG. 3A, the sensing primitive operator, SOUND, continuously samples audio data at 8 kHz. The audio data is transmitted two processing primitive operators RMS and FFT which are connected to SOUND. Results of RMS and FFT are further processed through a series of operators and transmitted to GMM (Gaussian Mixture Model). The musical genre is classified by GMM.

The dataflow graph in FIG. 3B is a dataflow graph of a context monitoring application, FindMyPhone. FindMyPhone enables a user to trace the user's mobile apparatus when the user lost the mobile apparatus inside buildings. To trace the user's mobile apparatus, the mobile apparatus continuously localizes itself and reports a location of the mobile apparatus to a designated server.

FIG. 3B represents the dataflow graph of a simple chain shape. In FIG. 3B, the sensing primitive operator, SOUND, continuously generates sound data at 44.1 kHz and transmits the sound data to a processing primitive operator, WINDOW FUNCTION next to SOUND. A result of WINDOW FUNCTION is transmitted to NEAREST-NEIGHBOR through a series of operators.

Figure 4:
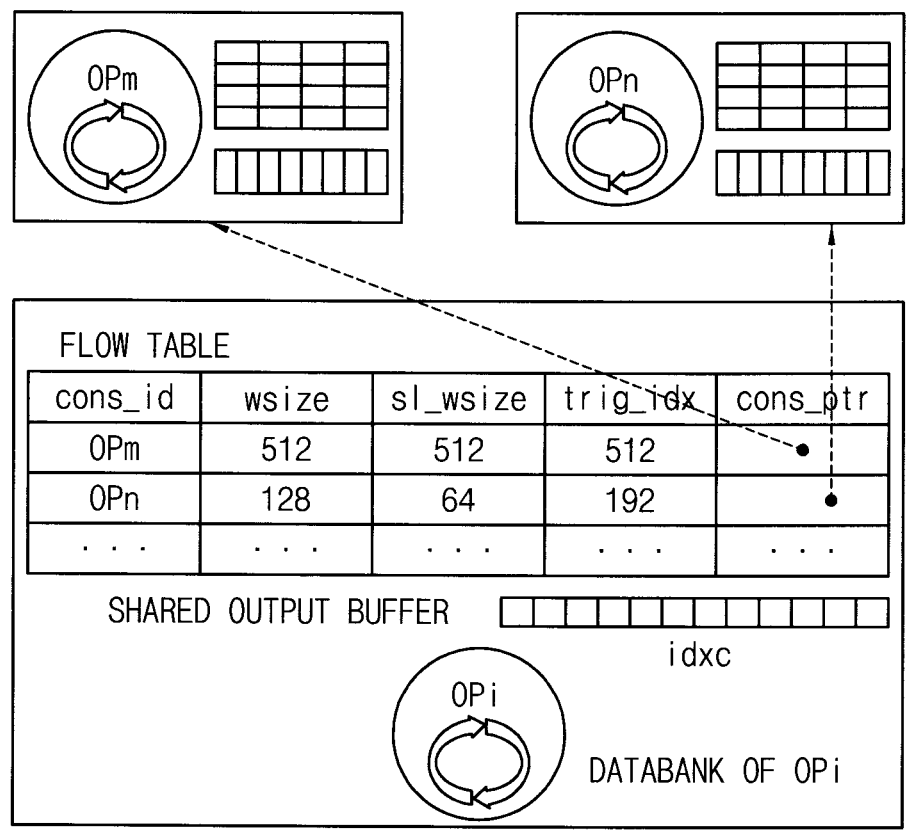
FIG. 4 is a conceptual diagram illustrating a structure of a data bank of an operator of the mobile apparatus of FIG. 1.

FIG. 4 is a conceptual diagram illustrating a structure of a data bank of an operator of the mobile apparatus 100 of FIG. 1. FIG. 5 is a conceptual diagram illustrating a network of the data bank of the operator of the mobile apparatus 100 of FIG. 1. FIG. 6 is a pseudo code for data bank execution of the operator of the mobile apparatus 100 of FIG. 1.

Referring to FIGS. 2 to 6, the mobile apparatus 100 generates a plurality of the operators based on the dataflow graph of the context monitoring application 300. For example, the operator may correspond to the primitive operator of the dataflow graph.

The operators may be a producer operator providing data and a consumer operator receiving the data. A single operator may be both the producer operator and the consumer operator according to a role of the operator.

Each of the operators includes a data bank. The data bank includes a shared output buffer and a flow table.

The shared output buffer of the producer operator stores data to transmit the consumer operators which are connected to the producer operator. The flow table of the producer operator stores information of the consumer operators.

The shared output buffer includes data processing results of the operator. The shared output buffer is defined in a viewpoint of the producer operator. Thus, the shared output buffer of the producer operator manages the data processing result in a single unified buffer, thereby eliminating redundant data management by multiple consumer operators. In addition, the producer operator may write the processing result directly on the shared output buffer. Accordingly, frequent memory allocation and deallocation overhead may be avoided.

For example, the shared output buffer may be a circular buffer. The shared output buffer may be a fixed-size circular buffer. The shared output buffer stores output data in the order of generation. The shared output buffer manages a current buffer index idxc to point a buffer position to be written next.

For example, a size of the shared output buffer may be set to the maximum value among the window sizes of the data requested by the consumer operators which are connected to the producer operators.

The flow table connects the producer operator to the consumer operators. The flow table includes information of the data requirement for the consumer operator.

For example, the flow table includes ID of the consumer operator "cons_id," a window size "wsize" of the data requested by the consumer operator, a sliding window size "sl_wsize" of the data requested by the consumer operator, a trigger index "trig_idx" which is the buffer index that points the end position of the next data for the consumer operator and a pointer of the data bank of the consumer operator "cons_ptr."

The trigger index is used to determine if the shared output buffer is filled up with the produced data, and signal the consumer operator to begin the operation.

In FIG. 4, a data bank of an operation OPi is constructed based on edges between the operation OPi and operations OPm and OPn. A size of an output shared buffer of the operator OPi may be set to maximum window size of the consumer operators OPm and OPn at an initialization time.

Referring again to FIG. 5, the mobile apparatus 100 includes a plurality of sensing operators S01, S02, S03 and S04 and a plurality of processing operators P01, P02, P03, P04, P05, P06, P07 and P08.

The data banks of the operators are connected to one another via the pointers in the flow table. For example, the data bank of the producer operator may pass the data to the data bank of the consumer operator via a direct function call of the consumer operator.

Thus, an overhead in communications between the operators may be decreased and expensive scheduling and queuing operations may be avoided. In addition, the direct transfer of control may result in synchronous execution of the operators, which facilitates the sharing of a single data buffer between a producer operator and multiple consumer operators.

The processing operators are synchronously executed. In contrast, due to an asynchronous nature of the sensing operators, the sensing operators may be asynchronously executed. Thus, the mobile apparatus 100 may further include a sensing data queue collecting the sensed data of the sensing operators.

The execution of the data bank includes three steps: (1) operator execution and in-place buffer write, (2) data requirement check and (3) data delivery to a consumer operator.

When the input data is inputted, the data bank of the producer operator executes Function execute ( ) (line 3 in FIG. 6).

In the step of execute, the operator executes Function write ( ) Accordingly, each result is directly written on the shared output buffer at the current buffer index idxc. The current buffer index idxc is updated whenever the write operation is performed.

After the execution of the producer operator, the flow table may be looked up to check if the output data is ready to signal the consumer operator (lines 4-7 in FIG. 6). For example, when the current buffer index idxc crosses over the trigger index trig_idx of the consumer operator, the producer operator outputs the output data to the consumer operator. Specifically, when the current buffer index idxc of the shared output buffer is greater than a previous buffer index idxp, the trigger index trig_idx of the consumer operator is greater than the previous buffer index idxp and the current buffer index idxc is greater than the trigger index trig_idx, the data bank of the producer operator may output the output data to the consumer operator.

The data bank of the producer operator may directly invoke Function execute of the consumer operator via the pointer of the data bank of the consumer operator to transmit the output data to the consumer operator.

When the producer operator is the sensing operator, the output data may be transmitted to the consumer operator through the sensing data queue.

The output data may be delivered by using a DataWindow abstraction. For example, the output data may be defined as a buffer pointer, a start index and a length of the output data. The buffer pointer may be a pointer of the shared output buffer. The start index may be a difference between the trigger index trig_idx and the window size wsize. The length of the output data may be the window size wsize of the data.

After delivery, the trigger index trig_idx is updated for the next data window (lines 15-16 in FIG. 6). For example, the data bank of the producer operator may add the sliding window size of the data to the trigger index trig_idx to generate the updated trigger index trig_idx.

The shared output buffer of the data bank of the producer operator is accessed by the multiple consumer operators as well as the producer operator. When the operators are the processing operators, the operators are synchronously executed so that the shared use of the shared output buffer is realized without complication. None of the operators try to access the shared buffer simultaneously.

However, the data bank of the sensing operator may require additional management for the shared use of the shared output buffer. The use of the data window passed to the consumer operators may be continuously tracked. In addition, before writing a new data at the current buffer position, the data bank of the sensing operator checks if there exists a data window that contains the current buffer position and has not been processed yet. If the data at the current buffer position has not been processed, the buffer space is extended.

According to the present inventive concept as explained above, the operator of the mobile apparatus includes the data bank having the shared output buffer and the flow table, so that the mobile apparatus may execute the dataflow efficiently. Thus, CPU usage for the context monitoring application may be decreased, and accordingly the number of the context monitoring applications which run concurrently may be increased.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A method of executing a dataflow, the method comprising:
    generating a plurality of operators based on a dataflow graph of a context monitoring application;
    storing data to transmit to consumer operators at a shared output buffer of a producer operator; and
    transmitting output data to the consumer operators based on a flow table of the producer operator, the flow table storing information of the consumer operators,
    wherein the flow table includes an identifier of the consumer operator, a window size of data requested by the consumer operator, a sliding window size of the data requested by the consumer operator, a trigger index pointing an end position of next data for the consumer operator and a pointer of a data bank of the consumer operator.

2. The method of claim 1, wherein the shared output buffer manages a current buffer index to point a buffer position to be written next.

3. The method of claim 1, further comprising executing the producer operator when input data is inputted to the producer operator.

4. The method of claim 3, further comprising checking if the output data are ready to be transmitted to the consumer operators after executing the producer operator.

5. The method of claim 4, wherein the output data are transmitted to the consumer operators when a current buffer index of the shared output buffer is greater than a previous buffer index, the trigger index is greater than the previous buffer index and the current buffer index is greater than the trigger index.

6. The method of claim 5, wherein the output data is defined as a buffer pointer, a start index and a length,
the buffer pointer is a pointer of the shared output buffer,
the start index is a difference between the trigger index and the window size, and
the length is the window size.

7. The method of claim 5, wherein the producer operator directly invokes an execute function of the consumer operator via the pointer of the data bank of the consumer operator.

8. The method of claim 5, further comprising adding the sliding window size to the trigger index to generate an updated trigger index after the producer operator transmits the output data to the consumer operators.

9. A method of monitoring a context, the method comprising:
generating a plurality of operators based on a dataflow graph of a context monitoring application;
storing data to transmit to consumer operators at a shared output buffer of a producer operator;
transmitting output data to the consumer operators based on a flow table of the producer operator, the flow table storing information of the consumer operators; and
transmitting a context monitoring result to the context monitoring application based on the output data,
wherein the flow table includes an identifier of the consumer operator, a window size of data requested by the consumer operator, a sliding window size of the data requested by the consumer operator, a trigger index pointing an end position of next data for the consumer operator and a pointer of a data bank of the consumer operator.

* * * * *

UNITED STATES PATENT AND TRADEMARK OFFICE
CERTIFICATE OF CORRECTION

PATENT NO. : 9,015,729 B2  
APPLICATION NO. : 13/847687  
DATED : April 21, 2015  
INVENTOR(S) : Song Page 1 of 1

It is certified that error appears in the above-identified patent and that said Letters Patent is hereby corrected as shown below:

On the title page item [30] insert

-- Foreign Application Priority Data

February 26, 2013 (KR) . . . . . . . . . . . 10-2013-0020477 --

Signed and Sealed this  
Third Day of November, 2015

Michelle K. Lee  
*Director of the United States Patent and Trademark Office*